(12) United States Patent
Al-Shafei et al.

(10) Patent No.: US 12,680,031 B2
(45) Date of Patent: Jul. 14, 2026

(54) METHODS OF PROCESSING HYDROCARBONS AND CARBON DIOXIDE

(71) Applicant: Saudi Arabian Oil Company, Dhahran (SA)

(72) Inventors: Emad Naji Al-Shafei, Dhahran (SA); Ammar H. Alahmed, Dhahran (SA); Mohammed Z. Al-Bahar, Dhahran (SA); Mohammad F. Aljishi, Dhahran (SA); Ahmed K. Asseel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 481 days.

(21) Appl. No.: 18/311,633

(22) Filed: May 3, 2023

(65) Prior Publication Data

US 2024/0368480 A1     Nov. 7, 2024

(51) Int. Cl.
| | |
|---|---|
| *C07C 5/333* | (2006.01) |
| *B01J 21/04* | (2006.01) |
| *B01J 21/06* | (2006.01) |
| *C10G 11/04* | (2006.01) |

(52) U.S. Cl.
CPC .............. *C10G 11/04* (2013.01); *B01J 21/04* (2013.01); *B01J 21/063* (2013.01); *B01J 21/066* (2013.01)

(58) Field of Classification Search
CPC ................................ C07C 5/322; C07C 5/333
See application file for complete search history.

(56) References Cited

U.S. PATENT DOCUMENTS

| | | | | |
|---|---|---|---|---|
| 7,417,173 | B2 * | 8/2008 | Crone ....................... | C07C 5/48 585/629 |
| 10,654,773 | B2 | 5/2020 | Doosa et al. | |
| 2004/0181107 | A1 | 9/2004 | Abdulwahed et al. | |
| 2018/0086679 | A1 | 3/2018 | Yang et al. | |

FOREIGN PATENT DOCUMENTS

| | | |
|---|---|---|
| CN | 1321098 C | 6/2007 |
| CN | 101342494 A | 1/2009 |
| CN | 101679874 B | 10/2013 |
| WO | 2017085604 A2 | 5/2017 |

OTHER PUBLICATIONS

E. N. Al-Shafei et al., CO-2-Assisted Propane Dehydrogenation Over of Zirconia-Titania Catalysts: Effect of the Carbon Dioxide to Propane Ratios on Olefin Yields, 9 J. Environ. Chem. Eng. 104989(1-9) (2021).*

Al-Shafei et al., "CO2-assisted propane deydrogenation over zirconia-titania catalysts: Effect of the carbon dioxide to propane ratios on olefin yields", Journal of Environmental Chemical Engineering, vol. 9, 104989, 2021, 9 pages.

Al-Shafei et al., "C—OH and C—C bonds activation of propane to propylene and ethylene selectivity assisted by CO2 over titania catalysts", New Journal of Chemistry, DOI: 10.1039/d1nj03541j, 2021, 31 pages.

Barghi et al., "Modeling of ZnZSM-5 deactivation during liquefied petroleum gas catalytic cracking in the presence of steam", Reaction Kinetics, Mechanisms and Catalysis, DOI: 10.1007/s11144-016-1126-2, Jan. 5, 2017, 22 pages.

Chen et al., "Dehydrogenation of propane over In2O3—Al2O3 mixed oxide in the presence of carbon dioxide", Journal of Catalysis, vol. 272, pp. 101-108, 2010.

Ren et al., "ZnO supported on high slica HZSM-5 as new catalysis for dehydrogenation of propane to propene in the presence of CO2", Catalysis Today, vol. 148, pp. 316-322, 2009.

Saudi Arabia Examination Report pertaining to Application No. 1020242293 dated May 11, 2026.

* cited by examiner

*Primary Examiner* — Randy Boyer
(74) *Attorney, Agent, or Firm* — Dinsmore & Shohl, LLP

(57) ABSTRACT

A method for processing hydrocarbons and carbon dioxide may include combining a hydrocarbon mixture with carbon dioxide to produce a reactant mixture, which may include at least 95 mol. % of the combination of the hydrocarbon mixture and the carbon dioxide. The molar ratio of carbon dioxide to the hydrocarbon mixture in the reactant mixture may be from 0.01 to 100. The hydrocarbon mixture may include from 30 mol. % to 90 mol. % of propane, 5 mol. % to 50 mol. % of n-butane, and 5 mol. % to 50 mol. % of iso-butane. The method may also include contacting the reactant mixture with a catalyst in a reactor to produce a product mixture and passing the product mixture out of the reactor. The product mixture may include from 5 mol. % to 50 mol. % of one or more olefins, 1 mol. % to 25 mol. % of hydrogen gas, and 1 mol. % to 25 mol. % of carbon monoxide.

14 Claims, 5 Drawing Sheets

04-013-9936>$Zr_{0.1}Ti_{0.9}O_2$ – Titanium Zirconium Oxide

Two-Theta (deg)

METHODS OF PROCESSING HYDROCARBONS AND CARBON DIOXIDE

TECHNICAL FIELD

Embodiments of the present disclosure generally relate to hydrocarbon processing, and more particularly, to methods of processing hydrocarbons and carbon dioxide.

BACKGROUND

Olefins, including ethylene, propylene, and butene, are basic intermediates used by a large portion of the petrochemical industry. In particular, pure streams of olefins may be used during the production of various polymers and chemicals. Traditionally, olefins may be produced by thermal cracking of petroleum fractions such as naphtha, kerosene, or gas oil. Olefins could also be produced by catalytic cracking processes.

Syngas, a mixture of hydrogen and carbon monoxide, is another compound used by the petrochemical industry. In particular, syngas may be used during the production of ammonia, methanol, and in the Fisher-Tropsch process. Syngas may be produced by steam reforming or coal gasification.

Additionally, carbon dioxide is a well-known green-house gas. Societal efforts are underway to reduce carbon dioxide emissions.

As the demand for olefins and syngas increases, there is a need for improved methods to produce olefins and syngas, while at the same time mitigate carbon dioxide transmission to the environment.

SUMMARY

The methods described herein may be utilized to process hydrocarbons and carbon dioxide to produce one or more of hydrogen gas, carbon monoxide, and one or more olefins, by contacting a hydrocarbon mixture and carbon dioxide with a catalyst. Conventional methods for processing hydrocarbons and carbon dioxide, may, for example, only utilize a feed stream comprising a single hydrocarbon, such as propane, along with carbon dioxide, or may only produce one or more olefins and not produce hydrogen gas, carbon monoxide, and olefins. By comparison, the methods of the present disclosure may process a hydrocarbon mixture comprising propane, n-butane, and iso-butane, along with carbon dioxide, to produce one or more olefins, hydrogen gas, and carbon monoxide in a single process. Accordingly, the methods of the present disclosure can be utilized to produce both olefins and syngas and to process a hydrocarbon mixture, while conventional methods may only produce olefins or syngas, or only utilize a feed stream comprising a single hydrocarbon. Thus, by the presently disclosed processes, carbon dioxide may be converted while forming valuable products.

According to one or more embodiments of the present disclosure a method for processing hydrocarbons and carbon dioxide may include combining a hydrocarbon mixture with carbon dioxide to produce a reactant mixture. The reactant mixture may include at least 95 mol. % of the combination of the hydrocarbon mixture and the carbon dioxide. The molar ratio of carbon dioxide to the hydrocarbon mixture in the reactant mixture may be from 0.01 to 100. The hydrocarbon mixture may include from 30 mol. % to 90 mol. % of propane, from 5 mol. % to 50 mol. % of n-butane, and from 5 mol. % to 50 mol. % of iso-butane. The method may also include contacting the reactant mixture with a catalyst in a reactor to produce a product mixture and passing the product mixture out of the reactor. The product mixture may include from 5 mol. % to 50 mol. % of one or more olefins, from 1 mol. % to 25 mol. % of hydrogen gas, and from 1 mol. % to 25 mol. % of carbon monoxide According to one or more additional embodiments of the present disclosure a method for processing hydrocarbons and carbon dioxide may include combining a hydrocarbon mixture with carbon dioxide to produce a reactant mixture. The reactant mixture may include at least 95 mol. % of the combination of the hydrocarbon mixture and the carbon dioxide. The molar ratio of carbon dioxide to the hydrocarbon mixture in the reactant mixture may be from 0.01 to 100. The hydrocarbon mixture may include one or more of propane, n-butane, and iso-butane. The method may also include contacting the reactant mixture with a catalyst in a reactor to produce a product mixture. The catalyst may include from 0.1 wt. % to 5 wt. % of one or more of $Na_2O$, $K_2O$, MgO. CaO. SrO, BeO, and BaO, from 45 wt. % to 90 wt. % of $TiO_2$, from 10 wt. % to 40 wt. % of $Al_2O_3$, and from 1 wt. % to 10 wt. % of $ZrO_2$. The method may also include passing the product mixture out of the reactor, wherein the product mixture comprises one or more of hydrogen gas, carbon monoxide, and one or more olefins.

It is to be understood that both the preceding general description and the following detailed description describe various embodiments and are intended to provide an overview or framework for understanding the nature and character of the claimed subject matter. Additional features and advantages of the embodiments will be set forth in the detailed description and, in part, will be readily apparent to persons of ordinary skill in the art from that description, which includes the accompanying drawings and claims, or recognized by practicing the described embodiments. The drawings are included to provide a further understanding of the embodiments and, together with the detailed description, serve to explain the principles and operations of the claimed subject matter. However, the embodiments depicted in the drawings are illustrative and exemplary in nature, and not intended to limit the claimed subject matter.

BRIEF DESCRIPTION OF THE DRAWINGS

The following detailed description of specific embodiments of the present disclosure can best be understood when read in conjunction with the following drawings, where like structure is indicated with like reference numerals and in which.

Figure 1:
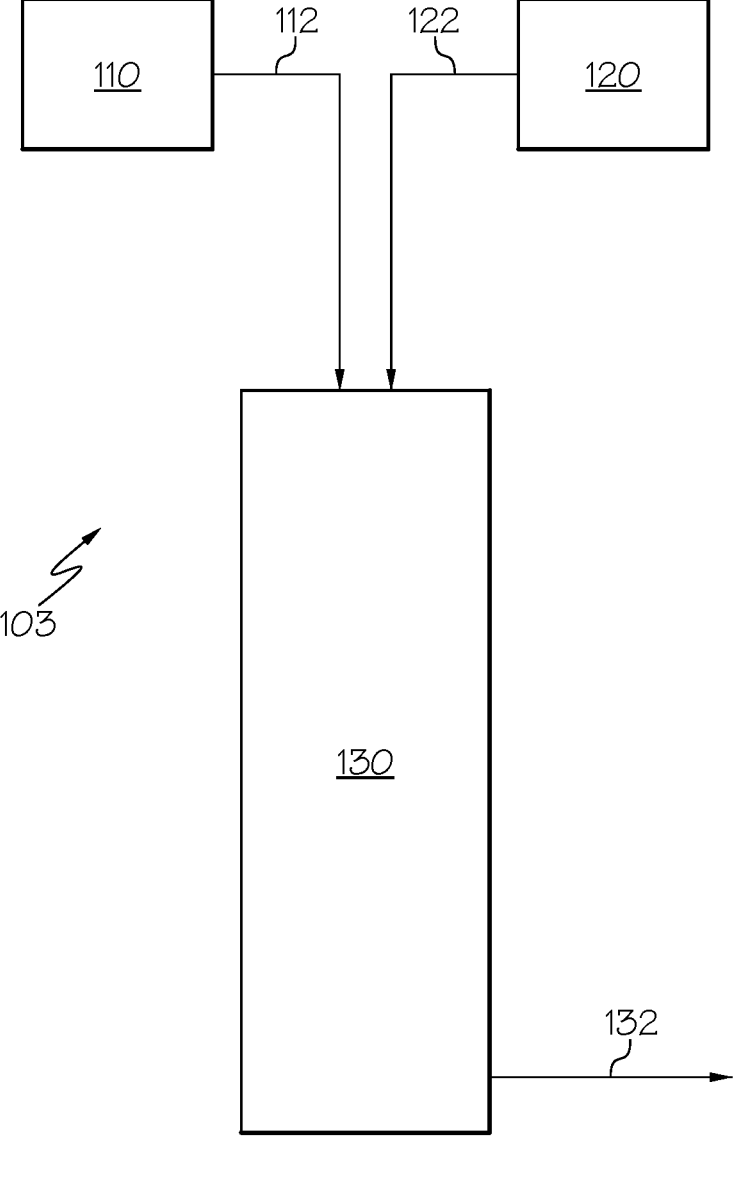
FIG. 1 schematically depicts a reactor system, according to one or more embodiments of the present disclosure.

For the purpose of describing the simplified schematic illustrations and descriptions of the relevant figures, the numerous valves, temperature sensors, electronic controllers and the like that may be employed and well known to those of ordinary skill in the art of certain chemical processing operations are not included. Further, accompanying components that are often included in typical chemical processing operations, such as air supplies, catalyst hoppers, and flue gas handling systems, are not depicted. It should be understood that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

Arrows shown in dashed line may signify optional streams or steps. However, it should be understood that not all solid lined arrows necessarily signify necessary streams or steps that would be present in all embodiments.

It should be understood that according to the embodiments presented in the relevant figures, an arrow between two system components may signify that the stream is not processed between the two system components. In other embodiments, the stream signified by the arrow may have substantially the same composition throughout its transport between the two system components. Additionally, it should be understood that in one or more embodiments, an arrow may represent that at least 75 wt. %, at least 90 wt. %, at least 95 wt. %, at least 99 wt. %, at least 99.9 wt. %, or even 100 wt. % of the stream is transported between the system components. As such, in some embodiments, less than all of the streams signified by an arrow may be transported between the system components, such as if a slip stream is present.

It should be understood that two or more process streams are "mixed" or "combined" when two or more lines intersect in the schematic flow diagrams of the relevant figures. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to processes and systems for converting a hydrocarbon mixture and carbon dioxide into one or more of hydrogen, carbon monoxide, and one or more olefins. In one or more embodiments, a method of converting hydrocarbons and carbon dioxide may generally include steps of combining a hydrocarbon mixture with carbon dioxide to produce a reactant mixture, contacting the reactant mixture with a catalyst in a reactor to produce a product mixture, and passing the product mixture out of the reactor.

Now referring to FIG. 1, a reactor system 100 is depicted that may be used to perform the methods of the present disclosure. The reactor system 100 may include a reactor 130, a hydrocarbon mixture source 110 that supplies a hydrocarbon mixture, and carbon dioxide source 120 that supplies carbon dioxide. The hydrocarbon mixture and the carbon dioxide may be fed into the reactor 130, via stream 112 and stream 122, respectively. In one or more embodiments, the hydrocarbon mixture may comprise, consist essentially of, or consist of one or more of propane, n-butane, and iso-butane. In one or more embodiments, the hydrocarbon mixture may comprise, consist essentially of, or consist of from 30 mol. % to 90 mol. % of propane, from 5 mol. % to 50 mol. % of n-butane, and from 5 mol. % to 50 mol. % of iso-butane. In some embodiments, the hydrocarbon mixture may be liquefied petroleum gas ("LPG"). In one or more embodiments, as shown in FIG. 1, the hydrocarbon mixture and the carbon dioxide may be combined in the reactor 130 to form a reactant mixture. In other embodiments, as shown in the reactor system 102 of FIG. 2, the hydrocarbon mixture and the carbon dioxide may be combined to form a reactant mixture in a mixing vessel 140 before entering the reactor 130, and the reactant mixture may be fed into the reactor 130 via reactant mixture feed stream 142.

Figure 2:
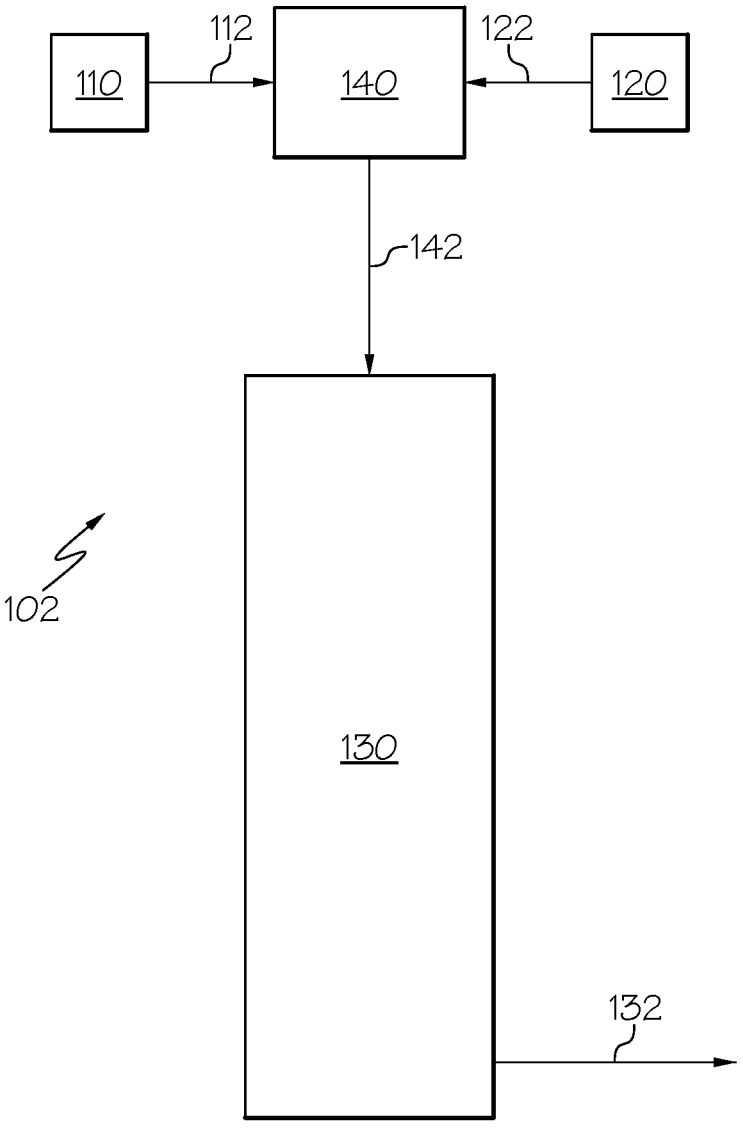
FIG. 2 schematically depicts another reactor system, according to one or more embodiments of the present disclosure.

Referring still to FIGS. 1 and 2, the reactant mixture may be contacted with a catalyst in the reactor 130 to produce a product mixture. As used in the present disclosure, the term "catalyst" refers to any substance that increases the rate of a specific chemical reaction. In one or more embodiments the catalyst may comprise, consist essentially of, or consist of an alkali or alkaline earth metal oxide, an oxide of titanium, aluminum oxide, and an oxide of zirconium. The product mixture may be passed out of the reactor 130 via product mixture stream 132. In one or more embodiments, the product mixture may comprise one or more of hydrogen gas, carbon monoxide, and one or more olefins. In some embodiments, in additional to products from the reaction, the product mixture may also comprise non-reacted reactants from the reactant mixture.

As described herein, in one or more embodiments, the hydrocarbon mixture may comprise from 30 mol. % to 90 mol. % of propane. For example, the hydrocarbon mixture may comprise from 30 mol. % to 35 mol. %, from 35 mol. % to 40 mol. %, from 40 mol. % to 45 mol. %, from 45 mol. % to 50 mol. %, from 50 mol. % to 55 mol. %, from 55 mol. % to 60 mol. %, from 60 mol. % to 65 mol. %, from 65 mol. % to 70 mol. %, from 70 mol. % to 75 mol. %, from 75 mol. % to 80 mol. %, from 80 mol. % to 85 mol. %, from 85 mol. % to 90 mol. %, or any combination of one or more of these ranges, of propane.

In one or more embodiments, the hydrocarbon mixture may comprise from 5 mol. % to 50 mol. % of n-butane. For example, the hydrocarbon mixture may comprise from 5 mol. % to 10 mol. %, from 10 mol. % to 15 mol. %, from 15 mol. % to 20 mol. %, from 20 mol. % to 25 mol. %, from 25 mol. % to 30 mol. %, from 30 mol. % to 35 mol. %, from 35 mol. % to 40 mol. %, from 40 mol. %, to 45 mol. %, from 45 mol. % to 50 mol. %, or any combination of one or more of these ranges, of n-butane.

In one or more embodiments, the hydrocarbon mixture may comprise from 5 mol. % to 50 mol. % of iso-butane. For example, the hydrocarbon mixture may comprise from 5 mol. % to 10 mol. %, from 10 mol. % to 15 mol. %, from 15 mol. % to 20 mol. %, from 20 mol. % to 25 mol. %, from 25 mol. % to 30 mol. %, from 30 mol. % to 35 mol. %, from 35 mol. % to 40 mol. %, from 40 mol. %, to 45 mol. %, from 45 mol. % to 50 mol. %, or any combination of one or more of these ranges, of iso-butane.

According to some embodiments, the hydrocarbon mixture may comprise, consist essentially of, or consist of liquefied petroleum gas ("LPG"). The above disclosed ranges of propane, n-butane, and iso-butane may fall within the compositional ranges commonly known to be included in LPG, as would be understood by those skilled in the art.

As described herein, the hydrocarbon mixture and the carbon dioxide may be combined to form a reactant mixture. In one or more embodiments, the reactant mixture comprises at least 95 mol. % of the combination of the hydrocarbon mixture and the carbon dioxide. For example the reactant mixture comprises at least 96 mol. % of the combination of the hydrocarbon mixture and the carbon dioxide, at least 97 mol. %, at least 98 mol. %, at least 99 mol. %, or even at least 99.5 mol. %. In one or more embodiments, the molar ratio of carbon dioxide to the hydrocarbon mixture in the reactant mixture may be from 0.01 to 100. For example, the molar ratio of carbon dioxide to the hydrocarbon mixture in the reactant mixture may be from 0.01 to 10, from 10 to 20, from 20 to 30, from 30 to 40, from 40 to 50, from 50 to 60, from 60 to 70, from 70 to 80, from 80 to 90, from 90 to 100, or any combination of one of these ranges. In some embodiments, the molar ratio of carbon dioxide to the hydrocarbon mixture in the reactant mixture may be from 1 to 25. Without being bound by theory it is believed that a molar ratio of carbon dioxide to the hydrocarbon mixture in the reactant mixture of less than 0.01 may reduce the olefin yield and olefin selectivity of the reaction. It is also believed, however, that a molar ratio of carbon dioxide to the hydrocarbon mixture in the reactant mixture of greater than 100 may cause carbon dioxide molecules to be adsorbed by the catalyst reducing the conversion of the hydrocarbon mixture and subsequently reducing the olefin yield of the reaction.

Referring back to FIGS. 1 and 2, in one or more embodiments, the reactant mixture may contact a catalyst in the reactor 130 to produce a product mixture. The catalyst may comprise, consist essentially of, or consist of an alkali or alkaline earth metal oxide, an oxide of titanium, aluminum oxide, and an oxide of zirconium. In one or more embodiments, the catalyst may comprise from 0.1 wt. % to 5 wt. % of one or more of $Na_2O$, $K_2O$, $MgO$, $CaO$, $SrO$, $BeO$, and $BaO$, from 45 wt. % to 90 wt. % of $TiO_2$, from 10 wt. % to 40 wt. % of $Al_2O_3$, and from 1 wt. % to 10 wt. % of $ZrO_2$. According to one or more embodiments, the catalyst may comprise a $TiO_2$ support coated with one or more of $Na_2O$, $K_2O$, $MgO$, $CaO$, $SrO$, $BeO$, and $BaO$. The coated $TiO_2$ support may be bound with $Al_2O_3$ and coated with $ZrO_2$. In one or more embodiments, the catalyst may not comprise one or more of platinum, ruthenium, rhodium, palladium, osmium, iridium, platinum, and gold. Without being bound by theory it is believed that a catalyst comprising an alkali or alkaline earth metal oxide, an oxide of titanium, aluminum oxide, and an oxide of zirconium may be catalytically active for both the conversion of carbon dioxide to carbon monoxide and the conversion of the hydrocarbon mixture to olefins and hydrogen gas. Accordingly, such a catalyst may be beneficially utilized in the methods of the present disclosure to convert a hydrocarbon mixture and carbon dioxide to hydrogen gas, carbon monoxide, and one or more olefins. It is also believed that such a catalyst can be utilized without requiring the use of expensive metals such as platinum, ruthenium, rhodium, palladium, osmium, iridium, platinum, and gold which may reduce the cost of operating reactor systems that utilize the catalyst.

In one or more embodiments, the catalyst may comprise from 0.1 wt. % to 5 wt. % of one or more of $Na_2O$, $K_2O$, $MgO$, $CaO$, $SrO$, $BeO$, and $BaO$. For example, the catalyst may comprise from 0.1 wt. % to 0.5 wt. %, from 0.5 wt. % to 1 wt. %, from 1 wt. % to 1.5 wt. %, from 1.5 wt. % to 2 wt. %, from 2 wt. % to 2.5 wt. %, from 2.5 wt. % to 3 wt. %, from 3 wt. % to 3.5 wt. %, from 3.5 wt. % to 4 wt. %, from 4 wt. % to 4.5 wt. %, from 4.5 wt. % to 5 wt. %, or any combination of one or more of these ranges, of one or more of. $Na_2O$, $K_2O$, $MgO$, $CaO$, $SrO$, $BeO$, and $BaO$. Without being bound by theory it is believed that a catalyst that comprises less than 0.1 wt. % or greater than 5 wt. % of one or more of $Na_2O$, $K_2O$, $MgO$, $CaO$, $SrO$, $BeO$, and $BaO$ may have reduced conversion of the hydrocarbon mixture when compared to a catalyst that comprises from 0.1 wt. % to 5 wt. % of one or more of $Na_2O$, $K_2O$, $MgO$, $CaO$, $SrO$, $BeO$, and $BaO$.

In one or more embodiments, the catalyst may comprise from 45 wt. % to 90 wt. % of $TiO_2$. For example, the catalyst may comprise from 45 wt. % to 50 wt. % from 50 wt. % to 55 wt. %, from 55 wt. % to 60 wt. %, from 60 wt. % to 65 wt. %, from 65 wt. % to 70 wt. %, from 70 wt. % to 75 wt. %, from 75 wt. % to 80 wt. %, from 80 wt. % to 85 wt. %, from 85 wt. % to 90 wt. %, or any combination of one or more of these ranges, of $TiO_2$.

In one or more embodiments, the catalyst may comprise from 10 wt. % to 40 wt. % of $Al_2O_3$. For example, the catalyst may comprise from 10 wt. % to 15 wt. %, from 15 wt. % to 20 wt. %, from 20 wt. % to 25 wt. %, from 25 wt. % to 30 wt. %, from 30 wt. % to 35 wt. %, from 35 wt. % to 40 wt. %, or any combination of one or more of these ranges, of $Al_2O_3$. Without being bound by theory, it is believed that a catalyst comprising less than 10 wt. % of $Al_2O_3$ may have reduced mechanical strength when compared to a catalyst that comprises greater than 10 wt. % of $Al_2O_3$. However, it is also believed that a catalyst that comprises greater than 40 wt. % of $Al_2O_3$ may have reduced activity for the conversion of the hydrocarbon mixture when compared to a catalyst that comprises from 10 wt. % to 40 wt. % of $Al_2O_3$.

In one or more embodiments, the catalyst may comprise from 1 wt. % to 10 wt. % of $ZrO_2$. For example, the catalyst may comprise from 1 wt. % to 2 wt. %, from 2 wt. % to 3 wt. %, from 3 wt. % to 4 wt. %, from 4 wt. % to 5 wt. %, from 5 wt. % to 6 wt. %, from 6 wt. % to 7 wt. %, from 7 wt. % to 8 wt. %, from 8 wt. % to 9 wt. %, from 9 wt. % to 10 wt. %, or any combination of one or more of these ranges, of $ZrO_2$. Without being bound by theory it is believed that a catalyst that comprises less than 1 wt. % or greater than 10 wt. % of $ZrO_2$ may have reduced hydrocarbon conversion and olefin selectivity when compared to a catalyst that comprises from 1 wt. % to 10 wt. % of $ZrO_2$.

In one or more embodiments, the catalyst may be formed using a multi-stage process. An exemplary multi-stage process will now be described. In the first stage, a coating of an alkali metal oxide or alkaline earth metal oxide may be placed over a titanium oxide support. One or more alkali metal or alkaline earth metal hydroxides or nitrates, such as, for example, $Mg(OH)_2$, $Mg(NO_3)_2$, $Ca(OH)_2$, $Ca(NO_3)_2$, $Sr(OH)_2$, $Sr(NO_3)_2$, $Ba(OH)_2$, $Ba(NO_3)_2$, $Be(OH)_2$, $Be(NO_3)_2$, NaOH, $NaNO_3$, KOH, or $KNO_3$, in an amount from 0.1 wt. % to 10 wt. %, based on the weight $TiO_2$, may be added to 400 kg of water. The solution may be sent to a mixer and may be mixed for from 5 minutes to 30 minutes at a temperature of from 15° C. to 50° C. The mixing may be performed at a speed of from 100 rpm to 1000 rpm. About 100 kg of Titanium oxide powder with a mesh size of from 100 to 300 may then be gradually added to the alkali or alkaline earth metal solution. The titanium oxide powder may be from 90 wt. % to 100 wt. % in anatase phase or may be from 10 wt. % to 90 wt. % in anatase phase combined with from 10 wt. % to 90 wt. % in rutile phase. In some embodiments, the titanium oxide powder may be from 70 wt. % to 90 wt. % in anatase phase and from 10 wt. % to 30 wt. % in rutile phase.

The titanium oxide powder and the alkali metal or alkaline earth metal solution may be mixed for from 2 hours to 8 hours at a temperature of from 15° C. to 50° C. The mixing may be performed at a speed of from 100 rpm to 1000 rpm. The mixing may be stopped and the mixture may be allowed to settle for from 24 hours to 48 hours. The titanium oxide powder may be separated from the solution and may have been coated with the alkali metal or alkaline earth metal hydroxides or nitrates used to form the solution. The coated titanium oxide powder may then be dried at a temperature from 100° C. to 120° C. for from 20 hours to 24 hours under static air. Once dried, the coated titanium oxide powder is calcined at a temperature from 600° C. to 700° C. for from 5 hours to 10 hours. The temperature during calcination may have a ramp rate of from 0.1° C./min to 20° C./min, such as, for example, from 0.5° C./min to 5° C./min. During calcination the alkali metal or alkaline earth metal hydroxides or nitrates may form a metal oxide coating on at least a portion of the surface of the titanium oxide powder.

In the second stage, the coated titanium oxide powder may then be mixed with from 1 wt. % to 50 wt. % of $Al(OH)_3$ powder based on the weight of the titanium oxide powder. The powders may be mixed for from 5 minutes to 60 minutes using a powder mixer at a speed of from 100 rpm to 1000 rpm. The mixed powders may then be transferred to an extrudate apparatus and from 1 wt. % to 15 wt. % of reverse osmosis water may be added, based on the weight of the mixed powder. The water and mixed powders may be formed into a binder paste before being pressed into an extrusion machine to make a binder having a diameter thickness of from 1 mm to 3 mm. The binder may then be dried at a temperature of from 55° C. to 85° C. for from 24 hours to 48 hours under static air. The dried binder may then be calcined at a temperature of from 350° C. to 500° C. for from 5 hours to 10 hours. The ramping temperature rate during calcination may be from 1° C./min to 20° C./min, such as, for example from 5° C./min to 10° C./min.

In the third stage, from 0.1 wt. % to 10 wt. % of one or more of zirconium hydroxide, zirconium chloride, or zirconium nitrate, based on the weight of $TiO_2$, may be added to 300 kg of water. The solution may be mixed for from 5 minutes to 3 minutes at a temperature of from 15° C. to 50° C., and a speed of from 100 rpm to 1000 rpm. The binder may then be added to the solution and the mixture may be mixed for from 2 hours to 8 hours at a temperature of from 15° C. to 50° C. and at a speed of from 10 rpm to 100 rpm. The mixing may then be stopped and the mixture may be allowed to settle for from 12 hours to 24 hours before the aqueous phase of the mixture may be evacuated from the binder. The binder may then be dried at a temperature of from 100° C. to 120° C. for from 20 hours to 24 hours under static air. The dried binder may then be calcined at a temperature of from 600° C. to 700° C. for from 5 hours to 10 hours. The ramping temperature rate during calcination may be from 1° C./min to 20° C./min, such as, for example from 5° C./min to 10° C./min. In this third stage a coating of $ZrO_2$ may be formed over at least a portion of the metal oxide coated titanium oxide powder in aluminum oxide binder.

Referring back to FIG. 1 and FIG. 2, contacting the reactant mixture with the catalyst in the reactor 130 may produce a product mixture. In one or more embodiments, the product mixture may comprise hydrogen gas, carbon monoxide, and one or more olefins. In some embodiments, the one or more olefins comprise one or more of ethylene, propylene, isobutene, 1-butene, 2-trans-butene, and 2-cis butene. In one or more further embodiments, the product mixture may comprise from 5 mol. % to 50 mol. % of one or more olefins, from 1 mol. % to 25 mol. % of hydrogen gas, and from 1 mol. % to 25 mol. % of carbon monoxide In one or more embodiments, the reactant mixture may contact the catalyst in the reactor 130 at a temperature of from 450° C. to 700° C. For example, the reactant mixture may contact the catalyst in the reactor 130 at a temperature of from 450° C. to 475° C., from 475° C. to 500° C., from 500° C. to 525° C., from 525° C. to 550° C., from 550° C. to 575° C., from 575° C. to 600° C., from 600° C. to 625° C., from 625° C. to 650° C., from 650° C. to 675° C., from 675° C. to 700° C., or any combination of one or more of these ranges.

A portion of the reactant mixture may not be fully reacted as it passes through the reactor 130. In such embodiments, the product mixture may further comprise one or more of carbon dioxide, propane, n-butane, and iso-butane. In one or more embodiments, from 20 mol. % to 80 mol. % of the hydrocarbon mixture in the reactant mixture may be converted to the one or more olefins. For example, from 20 mol. % to 30 mol. %, from 30 mol. % to 40 mol. %, from 40 mol. % to 50 mol. %, from 50 mol. % to 60 mol. %, from 60 mol. % to 70 mol. %, from 70 mol. % to 80 mol. %, or any combination of one or more of these ranges, of the hydrocarbon mixture in the reactant mixture may be converted to the one or more olefins.

In one or more embodiments, from 1 mol. % to 70 mol. % of the carbon dioxide in the reactant mixture may be converted to carbon monoxide. For example, from 1 mol. % to 10 mol. %, from 10 mol. % to 20 mol. %, from 20 mol. % to 30 mol. %, from 30 mol. % to 40 mol. %, from 40 mol. % to 50 mol. %, from 50 mol. % to 60 mol. %, from 60 mol. % to 70 mol. %, or any combination of one or more of these ranges, of the carbon dioxide in the reactant mixture may be converted to carbon monoxide.

As described herein, the reactant mixture may contact the catalyst in the reactor 130 to produce a product mixture. In one or more embodiments, the product mixture may comprise from 5 mol. % to 50 mol. % of one or more olefins. For example, the product mixture may comprise from 5 mol. % to 10 mol. %, 10 mol. % to 15 mol. %, from 15 mol. % to 20 mol. %, from 20 mol. % to 25 mol. %, from 25 mol. % to 30 mol. %, from 30 mol. % to 35 mol. %, from 35 mol. % to 40 mol. %, from 40 mol. % to 45 mol. %, from 45 mol. % to 50 mol. %, or any combination of one or more of these ranges, of one or more olefins.

In one or more embodiments, the product mixture may comprise from 1 mol. % to 25 mol. % of hydrogen gas. For example, the product mixture may comprise from 1 mol. % to 5 mol. %, from 5 mol. % to 10 mol. %, from 10 mol. % to 15 mol. %, from 15 mol. % to 20 mol. %, from 20 mol. % to 25 mol. %, or any combination of one or more of these ranges, of hydrogen gas.

In one or more embodiments, the product mixture may comprise from 1 mol. % to 25 mol. % of carbon monoxide. For example, the product mixture may comprise from 1 mol. % to 5 mol. %, from 5 mol. % to 10 mol. %, from 10 mol. % to 15 mol. %, from 15 mol. % to 20 mol. %, from 20 mol. % to 25 mol. %, or any combination of one or more of these ranges, of carbon monoxide.

In one or more embodiments, the product mixture may further comprise one or more of ethane and methane. In one or more embodiments, the product mixture may comprise from 1 mol. % to 50 mol. % of one or more of ethane and methane. For example, the product mixture may comprise from 1 mol. % to 5 mol. %, from 5 mol. % to 10 mol. %, from 10 mol. % to 15 mol. %, from 15 mol. % to 20 mol. %, from 20 mol. % to 25 mol. %, from 25 mol. % to 30 mol. %, from 30 mol. % to 35 mol. %, from 35 mol. % to 40 mol. %, from 40 mol. % to 45 mol. %, from 45 mol. % to 50 mol. %, or any combination of one or more of these ranges, of one or more of ethane and methane.

Referring still to FIG. 1 and FIG. 2, the product mixture may be passed out of the reactor via stream 132. Once passed out of the reactor 130 the product mixture may be passed to a separation unit. In one or more embodiments, the unreacted hydrocarbon mixture and carbon dioxide from the product mixture may be separated and may then be passed back to the reactor 130 for further conversion (not depicted). In embodiments where the product mixture further comprises one or more of ethane and methane, at least a portion of the ethane and methane may be separated from the product mixture and passed to a heating system to heat the reactor. In other embodiments, at least a portion of the ethane and methane may be separated from the product stream and passed to an electrical generator to provide energy to the process heating, cooling, and utilities pump.

Figure 3:
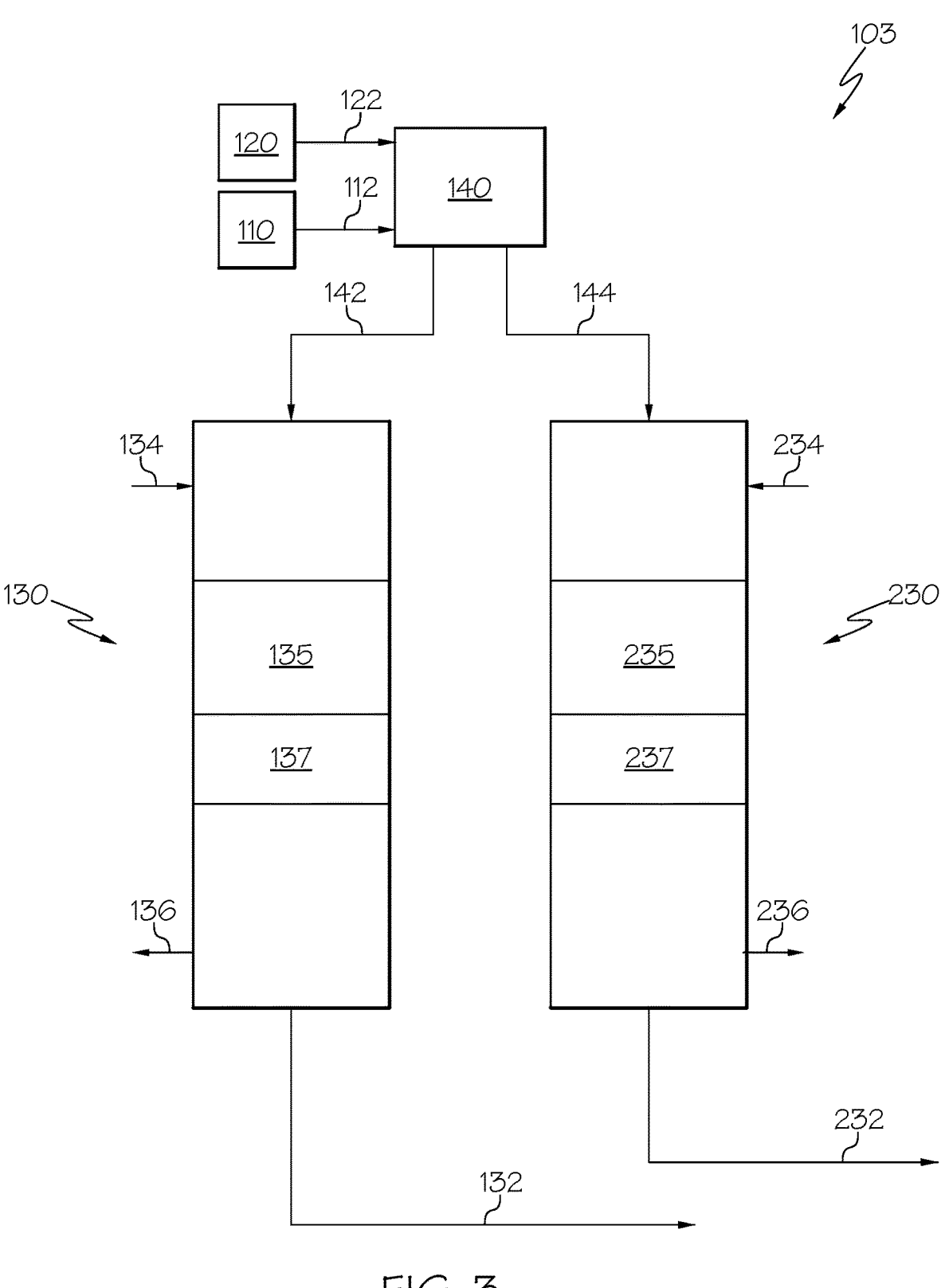
FIG. 3 schematically depicts a swing reactor system, according to one or more embodiments of the present disclosure.

Now referring to FIG. 3, another reactor system 103 that may be utilized with the methods of the present disclosure is schematically depicted. Reactor system 103 may be a swing-bed reactor system comprising two or more reactors. Reactor system 103 is depicted in FIG. 3 with two reactors 130 and 230, but it is contemplated that the methods of the present disclosure could be utilized in a reactor system comprising more than 2 reactors, such as, for example 3, 4, or even 5 reactors. In reactor system 103, carbon dioxide and the hydrocarbon mixture are mixed to form a reactant mixture. The carbon dioxide may have a gas hourly space velocity (GHSV) of from $1 \ h^{-1}$ to $1000 \ h^{-1}$ at atmospheric pressure, such as, for example, from $10 \ h^{-1}$ to $200 \ h^{-1}$. The hydrocarbon mixture may have a GHSV of from $0.05 \ h^{-1}$ to $200 \ h^{-1}$ at atmospheric pressure, such as, for example, from $1 \ h^{-1}$ to $30 \ h^{-1}$. The reactor 130 may be first heated before the reactant mixture may be fed to the reactor 130 via stream 142. The reactor 130 may be heated to a temperature of from 400° C. to 750° C., such as, for example, from 575° C. to 675° C.

In the reactor 130, the reactant mixture may first contact a preheating zone 135 which heats the reactant mixture before being passed to a reaction zone 137 where it contacts the catalyst. The preheating zone 135 may be from 10% to 200% of the volume of the reaction zone 137. The preheating zone 135 may be mostly filled with silicon carbide. In the reaction zone 137, the reactant mixture contacts the catalyst to form the product mixture which then exits reactor 130 via stream 132 and may be passed to a separation unit where the products, such as hydrogen gas, carbon monoxide, and one or more olefins, may be separated from non-reacted carbon dioxide or hydrocarbon mixture. After 1 hour to 15 hours of reactor 130 operating, reactor 230 may be heated to a temperature of from 400° C. to 750° C., such as, for example, from 575° C. to 650° C. and the reactant mixture may then be also passed to reactor 230 via stream 144. In reactor 230 the reactant mixture may first contact a preheating zone 235 which heats the reactant mixture before being passed to a reaction zone 237 where it contacts the catalyst to produce a product mixture which then may be passed from the reactor via stream 232 to a separation unit where the products, such as hydrogen gas, carbon monoxide, and one or more olefins, may be separated from non-reacted carbon dioxide or hydrocarbon mixture. The preheating zone 235 may be from 10% to 200% of the volume of the reaction zone 237. The preheating zone 235 may be mostly filled with silicon carbide. Reactor 130 and reactor 230 may be operated independently, such that one reactor may be operating, but not the other, or both reactors may be operated simultaneously.

While not depicted in FIGS. 1 and 2, the systems of FIGS. 1 and 2 may include the preheating zone 135 and reaction zone 137 as is depicted with respect to the reactor 130 in FIG. 3. Thus, it is contemplated herein that reactors that include the preheating zone 135 and reaction zone 137 may be utilized in non-swing bed operations.

As the catalyst is used in the reactor over time it may become deactivated. As used in the present disclosure, the term "deactivated" refers to a catalyst that has reduced catalytic activity. A deactivated catalyst may need to be regenerated or replaced. After 20 hours to 48 hours of operation the catalyst may need to be regenerated once the conversion of the hydrocarbon mixture to olefins declines 10% to 50% from the expected conversion of olefins, such as, for example, from 15% to 30%. The catalyst in the reactor system 103 may be regenerated in-situ by first stopping the flow of reactant mixture into the reactor 130, 230. The product mixture in the reactor may then be evacuated via stream 132, or 232. The reactor 130, 230 may then be heated to a temperature of from 575° C. to 750° C. A mixture of one or more of air and nitrogen may be fed into the reactor via stream 134 or 234 and the one or more of air and nitrogen exits the reactor via stream 136 or 236. The mixture may comprise 10 mol. % to 90 mol. % air mixed with 10 mol. % to 50 mol. % nitrogen gas, or 100 mol. % air. The GHSV of the regeneration gases fed into the reactor 130, 230 may be from 500 h$^{-1}$ to 10000 h$^{-1}$ at atmospheric pressure, such as, for example, from 1000 h$^{-1}$ to 3000 h$^{-1}$. Once the catalyst has been sufficiently regenerated the flow of gas from stream 134 or 234 can be stopped and the reactant mixture can be reintroduced to the reactor via stream 142 or 144 for further operation. Catalyst regeneration may be monitored using on-line gas analysis to detect the carbon dioxide content of the gas leaving the reactor via stream 136 or 236. Regeneration may be completed when the carbon dioxide content is less than from 0.05 mol. % to 0.3 mol. %. When regeneration is completed the temperature of the reactor may be lowered to the reaction temperature of from 400° C. to 700° C.

While one reactor is undergoing regeneration the other reactor may be operating to convert the reactant mixture simultaneously. For example, if reactor 130 is undergoing regeneration, reactor 230 may still be operating to convert the reactant mixture to the product mixture. The use of two or more reactors may allow for the in-situ regeneration of the catalyst within the reactor without requiring the entire reactor system 103 to stop the conversion of the reactant mixture.

EXAMPLES

The various embodiments of methods for making processing hydrocarbons and carbon dioxide will be further clarified by the following examples. The examples are illustrative in nature, and should not be understood to limit the subject matter of the present disclosure.

Example 1—Tetra-Metallic Oxide Catalyst Synthesis

Figure 6:
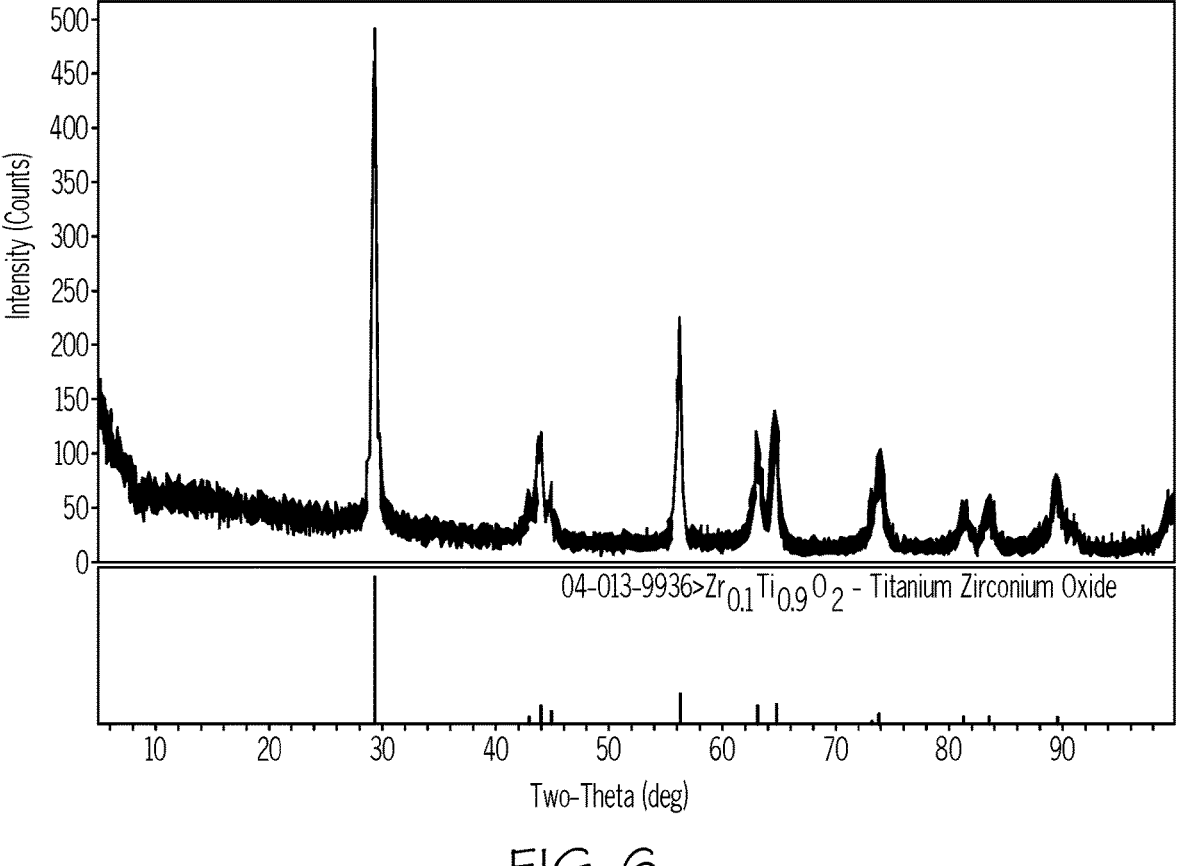
FIG. 6 depicts an X-ray diffraction pattern of a catalyst composition, according to one or more embodiments of the present disclosure.

The tetra-metallic oxide catalyst was synthesized using three steps. The target composition was a 6% Zr-1% Mg-10% Al/Ti catalyst. First, to achieve a coating of about 1% of Mg(+30%), a magnesium hydroxide solution of 0.24 g Mg(OH)$_2$ mixed in 50 ml of water was prepared and 10 g of titanium dioxide (TiO$_2$) support was added to the solution. The solution was then mixed for 4 hours before mixing was stopped to allow the mixture to settle before filtration to collect solid catalyst. The solid catalyst was transferred to an oven for drying at 90° C. for 24 hours followed by calcination at 650° C. under atmospheric air for 8 hours to obtain MgO coated TiO$_2$. Second, the coated TiO$_2$ was then bound with alumina by mixing 10 g of MgO—TiO$_2$ with 3 g of Al(OH)$_3$ powder. 1.0-2.0 g of water was then added to the mixed powders in order to make a paste before being extruded. Extrusion was followed by drying at 65° C. for 48 hours and then calcination at 450° C. for 8 hours. Third, to achieve a coating of about 6% of Zr (±30%), 1.05 g of zirconium hydroxide was mixed in 50 ml of water and stirred for 30 min followed by addition of 10 g of MgO—TiO$_2$—Al$_2$O$_3$ and mixed for 6 hours at stirring speed 300-600 rpm. The catalyst was filtered from the solution, dried at 90° C. for 18 hours and calcined at 700° C. for 6 hours to form ZrO$_2$—MgO—TiO$_2$—Al$_2$O$_3$. The composition of the catalyst was confirmed using X-ray diffraction, as shown in FIG. 6. Table 1 below shows surface properties of the catalyst as measured using Brunauer-Emmett-Teller analysis

TABLE 1

| Surface Area (m$^2$/g) | Pore Volume (cm$^3$/g) | Pore Size (Å) |
|---|---|---|
| 27 | 0.22 | 340 |

Example 2—Conversion of LPG and CO$_2$ at 600° C.

In Example 2, CO$_2$ and LPG were converted to olefins and syngas in a fixed bed reactor. The reactor was loaded with tetra-metallic oxide catalyst with the composition of 5 wt. % ZrO$_2$, 3 wt. % MgO, 75 wt. % TiO$_2$, 20 wt. % of Al$_2$O$_3$ binder. The reactor temperature was set to 600° C. The ratio of CO$_2$ to LPG sent to the reactor was adjusted to 10:1 at atmospheric pressure with a gas hourly space velocity of 83 h$^{-1}$. The reaction was performed for 20 hours and the amount of olefins and syngas produced over time was recorded in FIG. 4.

Figure 4:
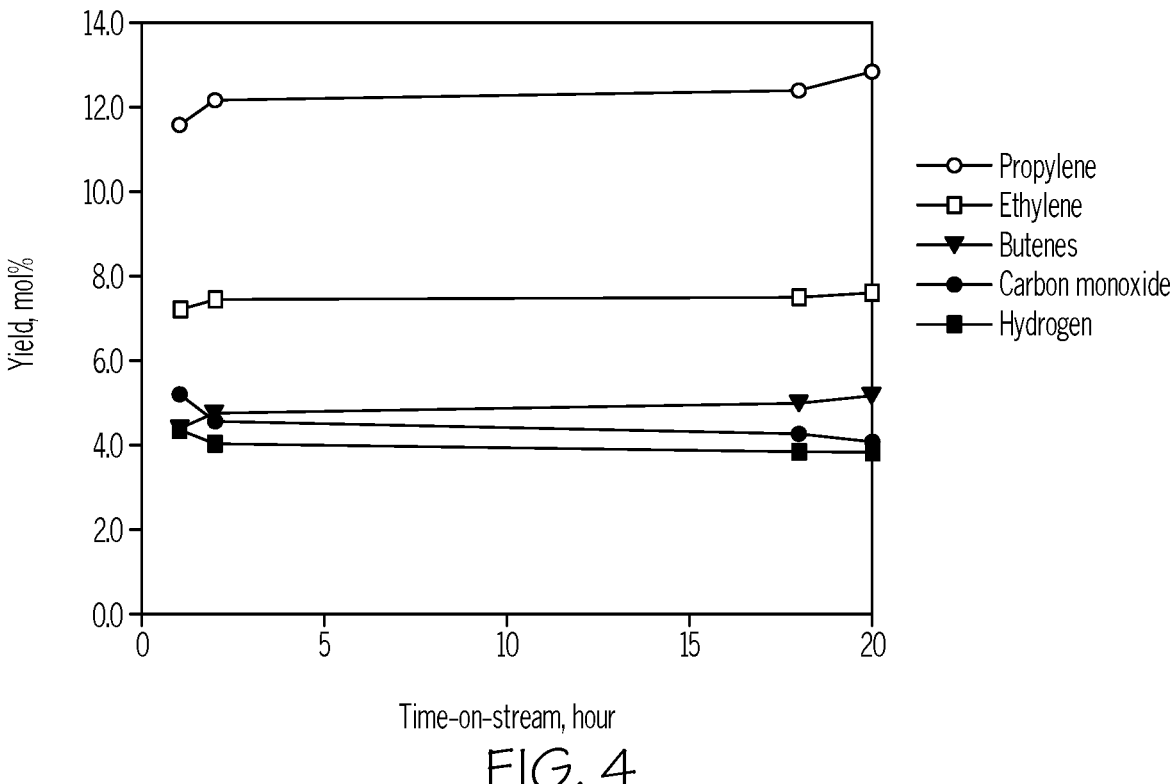
FIG. 4 graphically depicts the time-on-stream yield of olefins and syngas produced from $CO_2$ and LPG at 600° C., according to one or more embodiments of the present disclosure.

As shown in FIG. 4, the total olefin yield (ethylene, propylene, and butenes) was about 32.2 mol. % and the syngas yield (CO and H$_2$) was about 9.3 mol. %. This indicates that the CO$_2$ and LPG feed was effectively converted to produce olefins and syngas. Further, FIG. 4 show little or no reduction in yield over time for the reactor system after 20 hours of time-on-stream. The reactor system and tetra-metallic oxide catalyst may therefore be utilized for an extended time (e.g., greater than 20 hours) before requiring catalyst regeneration.

Example 3—Conversion of LPG and CO$_2$ at 615° C.

In Example 3, CO$_2$ and LPG were converted to olefins and syngas in a fixed bed reactor. The reactor was loaded with tetra-metallic oxide catalyst with the composition of 5 wt. % ZrO$_2$, 3 wt. % MgO, 75 wt. % TiO$_2$, 20 wt. % of Al$_2$O$_3$ binder. The reactor temperature was set to 615° C. The ratio of CO$_2$ to LPG sent to the reactor was adjusted to 10:1 at atmospheric pressure with a gas hourly space velocity of 83 h$^{-1}$. The reaction was performed for 24 hours and the amount of olefins and syngas produced over time was recorded in FIG. 5.

Figure 5:
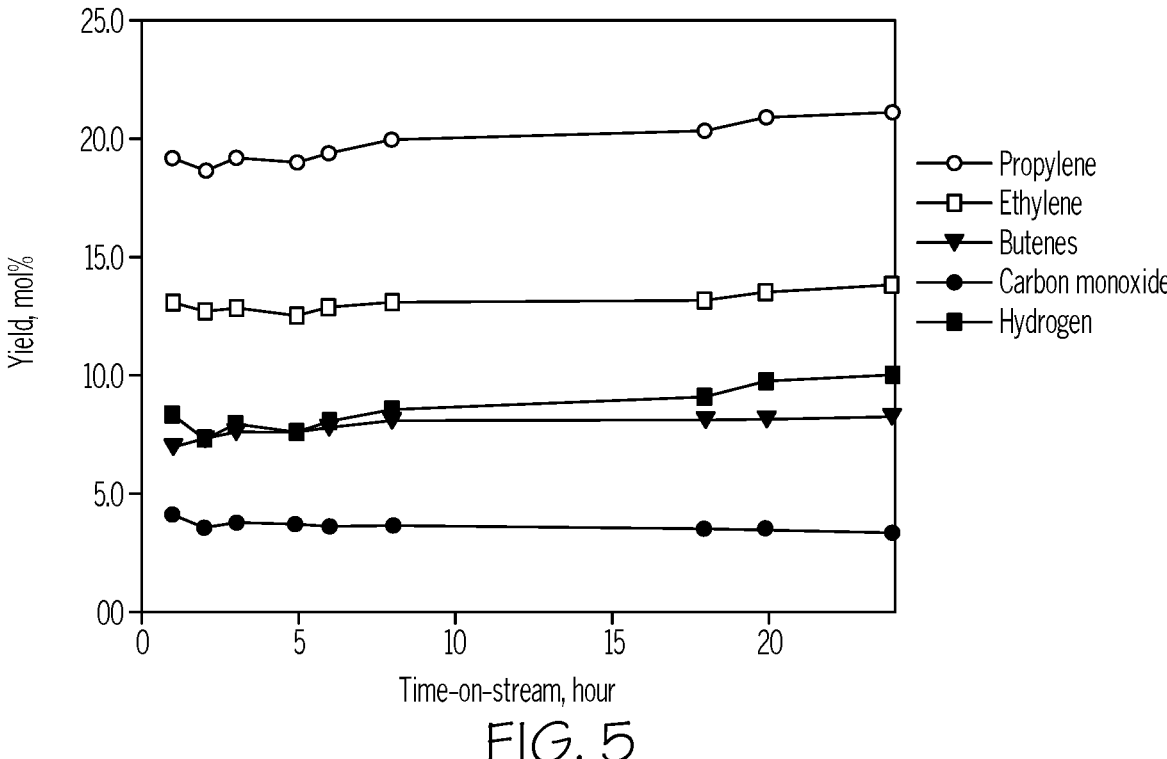
FIG. 5 graphically depicts the time-on-stream yield of olefins and syngas produced from $CO_2$ and LPG at 615° C., according to one or more embodiments of the present disclosure.

As shown in FIG. 5, the total olefin yield (ethylene, propylene, and butenes) was about 40.8 mol. % and the syngas yield (CO and H$_2$) was about 12.2 mol. %. This indicates that the CO$_2$ and LPG feed was effectively converted to produce olefins and syngas. FIG. 5 also indicates that the yield for the reactor system after 24 hours had no reduction. The reactor system and tetra-metallic oxide catalyst may therefore be utilized for greater than 24 hours without a reduction in product output or requiring the catalyst to be regenerated.

According to a first aspect of the present disclosure a method for processing hydrocarbons and carbon dioxide may include combining a hydrocarbon mixture with carbon dioxide to produce a reactant mixture. The reactant mixture may include at least 95 mol. % of the combination of the hydrocarbon mixture and the carbon dioxide. The molar ratio of carbon dioxide to the hydrocarbon mixture in the reactant mixture may be from 0.01 to 100. The hydrocarbon mixture may include from 30 mol. % to 90 mol. % of propane, from 5 mol. % to 50 mol. % of n-butane, and from 5 mol. % to 50 mol. % of iso-butane. The method may also include contacting the reactant mixture with a catalyst in a reactor to produce a product mixture and passing the product mixture out of the reactor. The product mixture may include from 5 mol. % to 50 mol. % of one or more olefins, from 1 mol. % to 25 mol. % of hydrogen gas, and from 1 mol. % to 25 mol. % of carbon monoxide.

A second aspect of the present disclosure may include the first aspect, where the catalyst comprises an alkali or alkaline earth metal oxide, an oxide of titanium, aluminum oxide, and an oxide of zirconium.

A third aspect of the present disclosure may include any of the first or second aspects, where the catalyst comprises from 0.1 wt. % to 5 wt. % of one or more of $Na_2O$, $K_2O$, MgO, CaO. SrO, BeO, and BaO, from 45 wt. % to 90 wt. % of $TiO_2$, from 10 wt. % to 40 wt. % of $Al_2O_3$, and from 1 wt. % to 10 wt. % of $ZrO_2$.

A fourth aspect of the present disclosure may include any previous aspect or combination of aspects where the catalyst comprises a $TiO_2$ support coated with one or more of $Na_2O$, $K_2O$, MgO, CaO, SrO, BeO, and BaO that is bound with $Al_2O_3$ and coated with $ZrO_2$.

A fifth aspect of the present disclosure may include any previous aspect or combination of aspects where the catalyst does not comprise one or more of platinum, ruthenium, rhodium, palladium, osmium, iridium, platinum, or gold.

A sixth aspect of the present disclosure may include any previous aspect or combination of aspects where the hydrocarbon mixture is liquefied petroleum gas.

A seventh aspect of the present disclosure may include any previous aspect or combination of aspects where the molar ratio of the carbon dioxide to the hydrocarbon mixture in the reactant mixture is from 1 to 25.

An eighth aspect of the present disclosure may include any previous aspect or combination of aspects where from 1 mol. % to 70 mol. % of the carbon dioxide in the reactant mixture is converted to carbon monoxide.

A ninth aspect of the present disclosure may include any previous aspect or combination of aspects where from 20 mol. % to 80 mol. % of the hydrocarbon mixture is converted to the one or more olefins.

A tenth aspect of the present disclosure may include any previous aspect or combination of aspects where the reactor comprises at least two swing reactors.

An eleventh aspect of the present disclosure may include any previous aspect or combination of aspects where the one or more olefins comprise one or more of ethylene, propylene, isobutene, 1-butene, 2-trans-butene, and 2-cis-butene.

A twelfth aspect of the present disclosure may include any previous aspect or combination of aspects where the product mixture further comprise from 1 mol. % to 50 mol. % of ethane and methane.

A thirteenth aspect of the present disclosure may include any previous aspect or combination of aspects where the reactant mixture contacts the catalyst in the reactor at a temperature of from 450° C. to 700° C.

A fourteenth aspect of the present disclosure may include any previous aspect or combination of aspects where the method further comprises separating an unreacted hydrocarbon mixture and carbon dioxide from the product mixture, where the unreacted hydrocarbon mixture comprises chemical species of the hydrocarbon mixture, and passing the unreacted hydrocarbon mixture and carbon dioxide back to the reactor.

According to a fifteenth aspect of the present disclosure a method for processing hydrocarbons and carbon dioxide may include combining a hydrocarbon mixture with carbon dioxide to produce a reactant mixture. The reactant mixture may include at least 95 mol. % of the combination of the hydrocarbon mixture and the carbon dioxide. The molar ratio of carbon dioxide to the hydrocarbon mixture in the reactant mixture may be from 0.01 to 100. The hydrocarbon mixture may include one or more of propane, n-butane, and iso-butane. The method may also include contacting the reactant mixture with a catalyst in a reactor to produce a product mixture. The catalyst may include from 0.1 wt. % to 5 wt. % of one or more of $Na_2O$, $K_2O$, MgO, CaO, SrO, BeO, and BaO, from 45 wt. % to 90 wt. % of $TiO_2$, from 10 wt. % to 40 wt. % of $Al_2O_3$, and from 1 wt. % to 10 wt. % of $ZrO_2$. The method may also include passing the product mixture out of the reactor, wherein the product mixture comprises one or more of hydrogen gas, carbon monoxide, and one or more olefins.

A sixteenth aspect of the present disclosure may include the fifteenth aspect, where the catalyst comprises a $TiO_2$ support coated with one or more of $Na_2O$, $K_2O$, MgO, CaO, SrO, BeO, or BaO that is bound with $Al_2O_3$ and coated with $ZrO_2$.

A seventeenth aspect of the present disclosure may include any of the fifteenth or sixteenth aspects, either alone or in any combination, where the hydrocarbon mixture comprises from 30 mol. % to 90 mol. % of propane, from 5 mol. % to 50 mol. % of n-butane, and from 5 mol. % to 50 mol. % of iso-butane.

An eighteenth aspect of the present disclosure may include any of the fifteenth to seventeenth aspects, either alone or in any combination, where the product mixture comprises from 5 mol. % to 50 mol. % of one or more olefins, from 1 mol. % to 25 mol. % of hydrogen gas, and from 1 mol. % to 25 mol. % of carbon monoxide.

A nineteenth aspect of the present disclosure may include any of the fifteenth to eighteenth aspects, either alone or in any combination, where the hydrocarbon mixture is liquefied petroleum gas.

A twentieth aspect of the present disclosure may include any of the fifteenth to nineteenth aspects, either alone or in any combination, where the molar ratio of carbon dioxide to the hydrocarbon mixture in the reactant mixture is from 1 to 25.

For the purposes of describing and defining the present disclosure it is noted that the terms "about" or "approximately" are utilized in this disclosure to represent the inherent degree of uncertainty that may be attributed to any quantitative comparison, value, measurement, or other representation. The terms "about" and/or "approximately" are also utilized in this disclosure to represent the degree by which a quantitative representation may vary from a stated reference without resulting in a change in the basic function of the subject matter at issue.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a stream or in a reactor should be appreciated as containing, in some embodiments, a mixture of isomers of that constituent. For example, a compositional range specifying butene may include a mixture of various isomers of butene. It should be appreciated that the examples supply compositional ranges for various streams, and that the total amount of isomers of a particular chemical composition can constitute a range.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "propylene stream" passing from a first system component to a second system component should be understood to equivalently disclose "propylene" passing from a first system component to a second system component, and the like.

What is claimed is:

1. A method for processing hydrocarbons and carbon dioxide, the method comprising:
   combining a hydrocarbon mixture with carbon dioxide to produce a reactant mixture, wherein the reactant mixture comprises at least 95 mol. % of the combination of the hydrocarbon mixture and the carbon dioxide, wherein the molar ratio of carbon dioxide to the hydrocarbon mixture in the reactant mixture is from 0.01 to 100, and wherein the hydrocarbon mixture comprises:
   from 30 mol. % to 90 mol. % of propane;
   from 5 mol. % to 50 mol. % of n-butane; and
   from 5 mol. % to 50 mol. % of iso-butane;
   contacting the reactant mixture with a catalyst in a reactor to produce a product mixture; and
   passing the product mixture out of the reactor, wherein the product mixture comprises:
   from 5 mol. % to 50 mol. % of one or more olefins;
   from 1 mol. % to 25 mol. % of hydrogen gas; and
   from 1 mol. % to 25 mol. % of carbon monoxide.

2. The method of claim 1, wherein the catalyst comprises:
   an alkali or alkaline earth metal oxide;
   an oxide of titanium;
   aluminum oxide; and
   an oxide of zirconium.

3. The method of claim 2, wherein the catalyst comprises
   from 0.1 wt. % to 5 wt. % of one or more of $Na_2O$, $K_2O$, MgO, CaO, SrO, BeO, and BaO;
   from 45 wt. % to 90 wt. % of $TiO_2$;
   from 10 wt. % to 40 wt. % of $Al_2O_3$; and
   from 1 wt. % to 10 wt. % of $ZrO_2$.

4. The method of claim 2, wherein the catalyst comprises a $TiO_2$ support coated with one or more of $Na_2O$, $K_2O$, MgO, CaO, SrO, BeO, and BaO that is bound with $Al_2O_3$ and coated with $ZrO_2$.

5. The method of claim 1, wherein the catalyst does not comprise one or more of platinum, ruthenium, rhodium, palladium, osmium, iridium, platinum, or gold.

6. The method of claim 1, wherein the hydrocarbon mixture is liquefied petroleum gas.

7. The method of claim 1, wherein the molar ratio of the carbon dioxide to the hydrocarbon mixture in the reactant mixture is from 1 to 25.

8. The method of claim 1, wherein from 1 mol. % to 70 mol. % of the carbon dioxide in the reactant mixture is converted to carbon monoxide.

9. The method of claim 1, wherein from 20 mol. % to 80 mol. % of the hydrocarbon mixture is converted to the one or more olefins.

10. The method of claim 1, wherein the reactor comprises at least two swing reactors.

11. The method of claim 1, wherein the one or more olefins comprise one or more of ethylene, propylene, isobutene, 1-butene, 2-trans-butene, and 2-cis-butene.

12. The method of claim 1, wherein the product mixture further comprise from 1 mol. % to 50 mol. % of ethane and methane.

13. The method of claim 1, wherein the reactant mixture contacts the catalyst in the reactor at a temperature of from 450° C. to 700° C.

14. The method of claim 1, wherein the method further comprises:
   separating an unreacted hydrocarbon mixture and carbon dioxide from the product mixture, wherein the unreacted hydrocarbon mixture comprises chemical species of the hydrocarbon mixture; and
   passing the unreacted hydrocarbon mixture and carbon dioxide back to the reactor.

* * * * *